United States Patent
Shen et al.

(10) Patent No.: US 12,442,390 B2
(45) Date of Patent: Oct. 14, 2025

(54) COMPRESSOR

(71) Applicant: Wuxi Cummins Turbo Technologies Company Ltd., Suzhou (CN)

(72) Inventors: Yue Shen, Suzhou (CN); Tianbao Li, Suzhou (CN); Yan Tian, Suzhou (CN)

(73) Assignee: Wuxi Cummins Turbo Technologies Company Ltd., Jiangsu (CN)

( * ) Notice: Subject to any disclaimer, the term of this patent is extended or adjusted under 35 U.S.C. 154(b) by 0 days.

(21) Appl. No.: 18/848,485

(22) PCT Filed: Mar. 18, 2022

(86) PCT No.: PCT/CN2022/081605
§ 371 (c)(1),
(2) Date: Sep. 18, 2024

(87) PCT Pub. No.: WO2023/173389
PCT Pub. Date: Sep. 21, 2023

(65) Prior Publication Data
US 2025/0215899 A1    Jul. 3, 2025

(51) Int. Cl.
*F04D 29/66* (2006.01)
*F04D 17/10* (2006.01)
*F04D 29/42* (2006.01)

(52) U.S. Cl.
CPC .......... *F04D 29/661* (2013.01); *F04D 17/10* (2013.01); *F04D 29/42* (2013.01)

(58) Field of Classification Search
CPC . F02B 2037/125; F04D 29/685; F04D 29/667
See application file for complete search history.

(56) References Cited

U.S. PATENT DOCUMENTS

| | | | |
|---|---|---|---|
| 4,743,161 A | 5/1988 | Fisher et al. | |
| 2009/0214334 A1* | 8/2009 | Fukami | F04D 29/4213 415/206 |

(Continued)

FOREIGN PATENT DOCUMENTS

| | | |
|---|---|---|
| CN | 101520054 A | 9/2009 |
| EP | 1473465 A1 | 11/2004 |

(Continued)

OTHER PUBLICATIONS

International Search Report and Written Opinion for International patent application No. PCT/CN2022/081605, filed Mar. 18, 2022, mailed Sep. 2, 2022.

(Continued)

*Primary Examiner* — Brian O Peters
(74) *Attorney, Agent, or Firm* — Faegre Drinker Biddle & Reath LLP

(57) ABSTRACT

A compressor housing (102) for a compressor comprises an inlet (104) comprising an inlet passage (120) defined at least in part by a baffle (110), a recirculation passage (122) defined between the baffle (110) and an outer wall (112), a first fluid communication passage (126), a second fluid communication passage (128) and a strut (131) extending axially across one of the first fluid communication passage (126) or the second communication passage (128) so as to support the baffle (110), the strut (131) extending circumferentially around at least a portion of the baffle (110). A centre of a bifurcation defines a first angular position (A) relative to a compressor axis (118), and the strut (131) is configured to block at least a portion of the recirculation passage (122) that is in the angular range of about −15° to about +45° relative to the first angular position (A). The baffle (110) defines an outer surface (142) on a radially outer side relative to the compressor axis (118) and an inner surface (144) on a radially inner side relative to the com- (Continued)

pressor axis (118). The strut (131) defines an arcuate width (W) measured along an interface between the outer surface (142) of the baffle (110) and the strut (131), the inner surface (144) defines an inlet passage diameter (D), and the ratio of the arcuate width (W) of the strut (131) to the inlet passage diameter (D) is between around 0.15:1 to around 0.35:1. The compressor housing provides improved map width enhancement.

27 Claims, 16 Drawing Sheets

(56) References Cited

U.S. PATENT DOCUMENTS

2010/0172741 A1\* 7/2010 Hosoya ................ F04D 29/665
                                                        415/206
2012/0260652 A1\* 10/2012 Hiry ..................... F04D 29/663
                                                        415/203

FOREIGN PATENT DOCUMENTS

| EP | 2194279 A1 | 6/2020 |
|----|------------|--------|
| JP | 04125633 U | 11/1992 |
| JP | 2009138612 A | 6/2009 |
| WO | 2018178385 A1 | 10/2018 |

OTHER PUBLICATIONS

International Preliminary Report on Patentability for International patent application No. PCT/CN2022/081605, filed Mar. 18, 2022, mailed Sep. 24, 2024.

\* cited by examiner

COMPRESSOR

CROSS-REFERENCE TO RELATED APPLICATIONS

The present application claims the benefit of priority to and is a U.S. national stage of International Patent Application No. PCT/CN2022/081605, filed Mar. 18, 2022, the content of which is incorporated herein by reference in its entirety.

The present invention relates to a compressor housing and a baffle insert for a compressor housing. In particular, the present invention relates to a compressor housing having a so-called "map width enhancement structure" comprising a baffle supported by a strut in which the strut is angularly aligned with a bifurcation of the compressor outlet and the strut has an increased arcuate width, and further relates to a baffle insert for a "map width enhancement structure" of a compressor housing in which the baffle insert comprises a strut having an increased arcuate width.

Compressors are used to increase the pressure of a working fluid. In the context of an internal combustion engine system, compressors are used to increase the pressure of the intake air to a pressure above atmospheric so as to enable a greater quantity of air to enter the engine. This increases the mass of oxygen available to support combustion, enabling a greater quantity of fuel to be used and therefore increasing the engine's power output. In internal combustion engine systems, such compressors may be driven by an electric motor, a turbine propelled by exhaust gas (i.e. forming a turbocharger), or a combination of the two.

Compressors typically comprise an inlet, an impeller wheel contained within an impeller chamber, and an outlet. During use, flow conditions within the impeller may cause the mass flow rate of working fluid through the impeller to slow down, for example due to flow separation from the impeller blades or due the formation of vortices between adjacent blade pairs and the impeller chamber of the compressor housing. If such flow conditions are allowed develop to a sufficient extent, the compressor may experience a so-called "surge" event. This may manifest in transient fluctuations of mass flow rate through the impeller and, in the worst case, may cause backwards flow through the impeller.

In order to mitigate against such surge events, it is known to provide the compressor inlet with a so-called "map width enhancement" structure, such as for example of the type described in U.S. Pat. No. 4,743,161 and EP 1,473,465. Such map width enhancement structures generally comprise an annular baffle surrounding an inducer of the impeller, and an annular outer wall spaced apart from and concentrically surrounding the baffle. The baffle and the outer wall define an annular recirculation passage therebetween. Such map width enhancement structures further comprise one or more recirculation inlet openings extending between the impeller chamber and the recirculation passage and one or more recirculation outlet openings extending between the recirculation passage and the main compressor inlet. Typically, the recirculation passage inlet openings are positioned aft of the leading edges of the impeller and are aligned with the portion of the impeller where undesirable flow conditions may form, such as flow separation and vortex formation.

During use, a portion of the working fluid is siphoned away from the compressor wheel chamber through the recirculation inlet opening and into the recirculation passage. Because the siphoned fluid originates from the impeller chamber and has been partially compressed by the impeller, the siphoned fluid has a higher pressure than the fluid in the main compressor inlet. Accordingly, the siphoned fluid passes back into the main compressor inlet via the recirculation outlet opening. The recirculation passage therefore enables the local pressure variations caused by flow abnormalities occurring within the impeller chamber to be balanced with the main compressor inlet by communication through the recirculation passage. This balancing effect mitigates against the formation and growth of such flow abnormalities, making the occurrence of surge events less likely. As a result, the minimum mass flow parameter required to avoid surge events at a given pressure ratio is reduced. In a compressor operating diagram comparing a mass flow parameter along an x-axis to a pressure ratio along a y-axis, this is observable as a leftward-shift of the surge line away from the choke line. This leftward-shift widens the so-called "map width" (i.e. the operating range) of the compressor, and hence the map width is said to be enhanced by the use of the above-described structure.

It is known to provide the recirculation passage inlet opening and/or recirculation passage outlet opening as a circumferential slit surrounding the entire circumference of the baffle. In such arrangements, one or more struts must be provided to bridge the opening so as to support the baffle within the compressor inlet. Typically, such struts are located within the recirculation passage. However, little is known regarding the effect of strut geometry on the surge performance of a compressor.

It is an object of the present invention to provide a compressor and/or baffle insert that provides improved map width enhancement.

According to a first aspect of the invention, there is provided a compressor housing for a compressor, the compressor housing comprising an inlet comprising an inlet passage configured to receive intake gas, the inlet passage being defined at least in part by a baffle; and a recirculation passage defined between the baffle and an outer wall; an impeller chamber in fluid communication with the inlet passage and configured to contain an impeller supported for rotation about a compressor axis; a first fluid communication passage extending between the impeller chamber and the recirculation passage to permit fluid communication therebetween; a second fluid communication passage extending between the inlet passage and the recirculation passage to permit fluid communication therebetween; an outlet in fluid communication with the impeller chamber, the outlet comprising a volute portion and an exit portion, the volute portion and the exit portion defining a bifurcation therebetween; and a strut extending axially across one of the first fluid communication passage or the second communication passage so as to support the baffle, the strut extending circumferentially around at least a portion of the baffle; wherein a centre of the bifurcation defines a first angular position (A) relative to the compressor axis, and the strut is configured to block at least a portion of the recirculation passage that is in the angular range of about −15° to about +45° relative to the first angular position (A); and wherein the baffle defines an outer surface on a radially outer side relative to the compressor axis and an inner surface on a radially inner side relative to the compressor axis; and wherein the strut defines an arcuate width (W) measured along an interface between the outer surface of the baffle and the strut, the inner surface defines an inlet passage diameter (D), and the ratio of the arcuate width of the strut to the inlet passage diameter (W:D) is between around 0.15:1 to around 0.35:1.

It has been found that the use of a wider strut influences the flow in the recirculation passage. Without wishing to be limited by theory, it is thought that the presence of turbulence in the recirculation passage increases the length of time taken for the recirculation passage to balance out any pressure fluctuations occurring in the compressor wheel chamber. It is thought that the use of larger struts interrupts the formation of turbulence, since larger struts take up a bigger volume within the recirculation passage and therefore displace a larger volume of fluid. By interrupting the formation of turbulence, it is thought that the time taken for the recirculation passage to equalise pressure between the first fluid communication passage and the second fluid communication passage is reduced. This increases the capacity of the compressor housing to smooth out pressure pulses that might cause surge events, and results in a reduction in the minimum mass flow required at a given pressure ratio to avoid surge. It has been found that the turbulence in the region of the recirculation passage that is closest to the angular position of the bifurcation is higher than the turbulence in the remainder of the recirculation passage. Without wishing to be limited by theory, a possible explanation for this occurrence is that the presence of the tongue in the compressor outlet creates a region of high static pressure, and that this is transferred upstream to the corresponding angular region of the recirculation passage. It is thought that by placing the strut within the turbulent region, the strut interrupts the formation of turbulence and acts to guide the flow so that it takes a more direct path from the first fluid communication passage to the second fluid communication passage. Because the flow in the recirculation passage take a more direct route, the amount of time taken for the recirculation passage to smooth out any pressure pulses occurring within the impeller is reduced, and therefore the map width of the compressor is increased. In addition to the position of the strut, it is thought that larger struts are better able to interrupt the formation of turbulence, since larger struts take up a bigger volume within the recirculation passage. Accordingly, it has been found that when the strut is angularly aligned in the range of between about −15° and +45° of the bifurcation and when the ratio of the strut width W to the inlet passage diameter D is between around 0.15:1 to around 0.35:1 the fluidic effect of the strut on the flow through the recirculation passage results in improved surge performance (i.e. provides a wider compressor map width).

Although in the aspect of the invention set out above the width of the struts is an arcuate distance (i.e. a length) and the width of the strut is defined as a ratio with respect to the inlet passage diameter, it will be appreciated that the width of the struts may equally be defined as an angular distance (i.e. an angle). In this way the width of the strut is defined in a manner which is independent of the compressor size/diameter. In particular, the width of the strut (e.g. the angle subtended between the sides of the wide strut, for example, at its narrowest part relative to the compressor axis) may be between approximately 12° and approximately 30° (equivalent to a ratio of arcuate width W to inlet passage diameter between approximately 0.15:1 to approximately 0.35:1).

The term "compressor housing" encompasses a single integrally formed component or an assembly of two or more separately formed components.

The term "volute portion" encompasses a portion of the compressor housing having a generally scroll-like shape configured to receive intake air that has been compressed by the impeller in a radial direction and to discharge the compressed intake air in a tangential direction relative to the compressor axis.

The term "exit portion" encompasses a portion of the compressor housing having a generally pipe-like or conduit-like shape that is configured to receive intake air from the volute portion in a tangential direction relative to the compressor axis and to discharge the intake air to one or more downstream components of an engine or fuel cell system, for example a charge air cooler (i.e. intercooler), an internal combustion engine, or a fuel cell. In some embodiments, the exit portion may be a straight pipe. In other embodiments, the exit portion may be an extension of the volute portion, such that the exit portion is considered to define the most downstream portion of the volute. In further embodiment, the exit portion may comprise additional fluid-interacting features such as a diffuser, a nozzle or the like.

The term "bifurcation" encompasses a fluidic interface between the most upstream end of the volute and the exit portion of the outlet. Such bifurcations are typically defined by a "tongue", which acts to split the intake air along two paths. One path circulates around the volute portion and the other path leaves the compressor by the exit portion.

The "centre of the bifurcation" encompasses the centre of the bifurcation. Such a geometrical centroid may be defined, for example, as the mid-point between the extremes of the tongue in a plane normal to the compressor axis.

The strut being "positioned so that it is configured to block at least a portion of the recirculation passage that is in the angular range of about −15° to about +45° relative to the first angular position" encompasses a portion of the strut extending into a region of space contained within the recirculation passage that is in the angular range of about −15° to about +45° relative to the first angular position. In some embodiments the entirety of the strut may be contained within such a region of space, whilst in other embodiments only a portion of the strut may be contained within such a region of space.

The term "inlet passage diameter" encompasses the diameter of the inner baffle surface. If the inner baffle surface is tapered, the inlet passage diameter is defined by the narrowest portion of the inner baffle surface. The inlet passage diameter should exclude the presence of any minor irregularities such as surface protrusions on the inner baffle surface.

The "interface between the outer surface of the baffle and the strut" encompasses an imaginary arc of a circle drawn from the compressor axis and having the same radius as the outer surface of the baffle. The term "interface" in this context should not be taken to imply the existence of a physical or manufacturing join at such a position, and may encompass arrangements in which the strut and the baffle are integrally formed.

The ratio of the strut width to the inlet passage diameter may be between around 0.2:1 to around 0.4:1, or around 0.2:1 to around 0.25:1, or around 0.23:1.

The angular centre of the strut relative to the compressor axis may be positioned within the range of about −15° to about +45° relative to the first angular position.

The "angular centre of the strut" encompasses the geometrical centre of the strut as defined with respect to the compressor axis. The angular centre of the strut may be aligned with the first angular position relative to the compressor axis.

The portion of the recirculation passage that is within the range of about −15° to about +45° relative to the first angular position may contain a single strut.

That is to say, such that no other struts are present within the portion of the recirculation passage that is within the range of about −15° to about +45° relative to the first angular position.

The strut may be configured to block at least a portion of the recirculation passage that is around 45° from the first angular position (A).

The strut and the baffle may be integrally formed.

The distance between the first fluid communication passage and the second fluid communication passage along the compressor axis may define a recirculation passage length L.

The ratio of the recirculation passage length to the inlet passage diameter (L:D) may be less than or equal to around 0.6:1, around 0.4:1, or around 0.2:1.

The recirculation passage may define a recirculation passage width in a radial direction relative to the compressor axis.

The strut may extend across at least 50% of the recirculation passage width.

The compressor housing may comprise a compressor body defining the outer wall and a baffle insert defining the baffle, the baffle insert and the compressor body being separately formed.

The compressor body may be a single integrally formed component. In addition to the outer wall, the compressor body may define at least part of the impeller chamber, the volute portion, and the exit portion.

The first fluid communication passage may be defined between an end of the baffle insert and the compressor body.

The second fluid communication passage may be defined by the baffle insert.

The strut may extend axially across the second fluid communication passage.

The insert may comprise a radially extending collar defining an end of the recirculation passage, the collar being configured to engage the outer wall so as to hold the baffle insert within the compressor body.

The baffle insert may comprise a first rotational location formation and the compressor body comprises a second rotational location formation, the first and second rotational location formations being configured to engage one another so as to determine the angular position of the strut.

The compressor housing may comprise a compressor body defining the outer wall and the baffle such that the outer wall and the baffle are integrally formed.

The compressor housing may further comprise an end cap received within the outer wall, the end cap being separately formed to the compressor body.

In addition to the outer wall and the baffle, the compressor body may define at least part of the impeller chamber, the volute portion, and the exit portion.

The first fluid communication passage may be defined by the compressor body.

The strut may extend axially across the first fluid communication passage.

The second fluid communication passage may be defined between an end of the baffle and the end cap.

The end cap may comprise a radially extending collar defining an end of the recirculation passage, the collar being configured to engage the outer wall so as to hold the end cap within the compressor housing.

According to a second aspect of the invention there is provided a baffle insert for a compressor housing, the baffle insert comprising a generally tubular body extending along a central axis and defining an outer surface on a radially outer side relative to the central axis and configured to at least partially define a recirculation passage of an inlet of the compressor during use; an inner surface on a radially inner side relative to the central axis, the inner surface defining an inlet passage diameter (D); a fluid communication passage extending between the inner surface and the outer surface; a strut extending radially outwards from the outer surface and axially across the fluid communication passage, the strut extending circumferentially around at least a portion of the baffle, wherein the strut defines an arcuate width (W) measured along an interface between the outer surface of the baffle and the strut; wherein the ratio of the arcuate width of the strut to the inlet passage diameter (W:D) is between around 0.15:1 to around 0.35:1.

See above regarding how the particular specified ratio of the arcuate width of the strut to the inlet passage diameter (W:D) is equivalent to a particular angle subtended by the strut.

The ratio of the strut width to the inlet passage diameter is between around 0.2:1 to around 0.3:1, or around 0.2:1 to around 0.25:1, or around 0.23:1.

The strut and the baffle may be integrally formed.

The baffle insert may define a distal end relative to the fluid communication passage. The distance between the fluid communication passage and the distal end along the central axis may define a recirculation passage length; and the ratio of the recirculation passage length to the inlet passage diameter may be less than or equal to around 0.6:1.

The ratio of the recirculation passage length to the inlet passage diameter may be less than or equal to around 0.4:1, or around 0.2:1.

The baffle insert may comprise a radially extending collar at least partially defining an end of the recirculation passage during use, the collar being configured to engage an outer wall of a compressor body of the compressor housing to hold the insert within the compressor body, the outer wall at least partially defining the recirculation passage during use.

The baffle insert may comprise a rotational location formation configured to engage a corresponding location formation of a compressor housing so as to position the baffle at a predetermined angular position relative to the compressor body.

The compressor may comprise an inlet comprising an inlet passage configured to receive intake gas, the inlet passage being defined at least in part by the baffle insert. The compressor may comprise an impeller chamber in fluid communication with the inlet passage and configured to contain an impeller supported for rotation about a compressor axis. The compressor may also comprise an outlet in fluid communication with the impeller chamber, the outlet comprising a volute portion and an exit portion, the volute portion and the exit portion defining a bifurcation therebetween. A centre of the bifurcation may define a first angular position (A) relative to the compressor axis. The rotational location formation may be configured to engage a corresponding location formation element of the compressor housing so as to position the baffle at a predetermined angular position relative to the compressor body such that the strut blocks at least a portion of the recirculation passage that is within about −15° to about +45° relative to the first angular position (A).

According to a third aspect of the invention there is provided a compressor comprising the compressor housing of the first aspect of the invention and/or the baffle insert of the second aspect of the invention.

Where appropriate, any of the optional features discussed above in relation to one of the aspects of the invention, may be applied to another aspect of the invention.

A detailed description of the invention will now be provided with reference to the accompanying drawings, in which.

Figure 1:
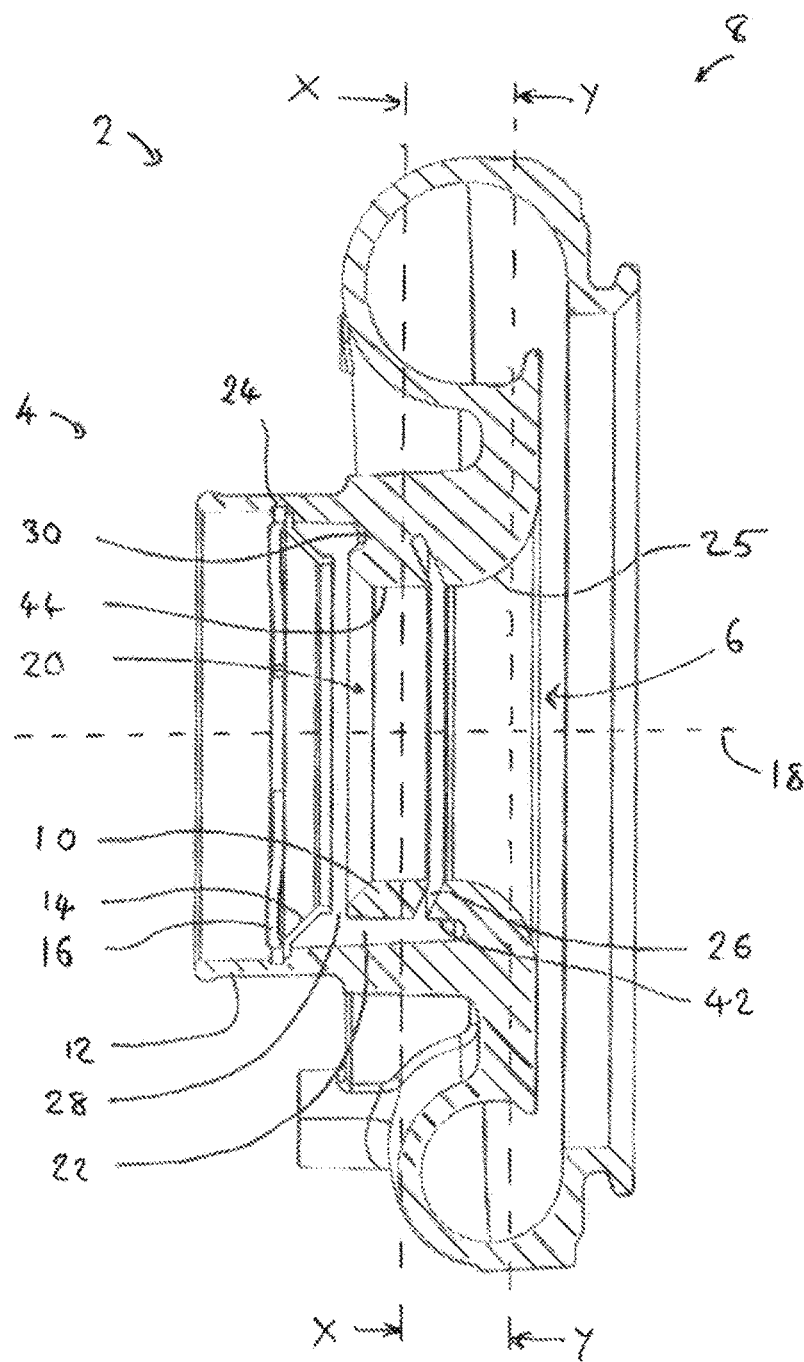
FIG. 1 is a cross-sectional side view of a prior art compressor housing.

FIGS. 1 to 4 show a prior art compressor housing 2 for a compressor. The compressor housing comprises an inlet 4, an impeller chamber 6 and an outlet 8. The inlet 4 comprises a baffle 10, an outer wall 12, an end cap 14 and a retaining ring 16. The baffle 10 and outer wall 12 are integrally formed and may be said to define a compressor body, from which the end cap 14 and retaining ring 16 are separable. The baffle 10 is generally tubular and extends axially along a compressor axis 18. The centre of the baffle 10 defines an inlet passage 20 configured to provide fluid to the impeller chamber 6, and, in particular, to an inducer of a centrifugal impeller (omitted for clarity) contained within the impeller chamber 6. The outer wall 12 concentrically and circumferentially surrounds the baffle 10. The outer wall 12 is spaced apart from the baffle 10 to define a generally annular recirculation passage 22 therebetween. The end cap 14 is formed as a generally frusto-conical piece of thin-walled material. The end cap 14 comprises a radially outer edge that is received within a circumferentially extending stepped groove 24 of the outer wall 12. The retaining ring 16 is received within the stepped groove 24 to hold the end cap 14 in position within the inlet 4.

The impeller chamber 6 is defined in part by an impeller chamber surface 25. The impeller chamber surface 25 closely conforms to the geometry of the impeller so as to contain the working fluid so that is compressed by the action of the impeller blades. Accordingly, the impeller chamber surface 25 is generally trumpet-shaped. The baffle 10 comprises a first fluid communication passage 26 that is defined by a circumferential slot extending between the recirculation passage 22 and the impeller chamber surface 25. The first fluid communication passage 26 is positioned so that, during use, it is downstream of the leading edges of the blades of the impeller (not shown).

A second fluid communication passage 28 extends between the recirculation passage 22 and the inlet passage 20. The second fluid communication passage 28 is defined by an annular gap between the end cap 14 and a distal end of the baffle 10 which are spaced apart along the compressor axis 18 by a small amount. The second recirculation passage 28 is positioned upstream of the leading edges of the blades of the impeller during use.

The baffle 10 is supported by three identical struts 30 that extend axially along the compressor axis 18. The struts 30 extend from a proximal end of the recirculation passage 22 relative to the impeller chamber 6 across the first fluid communication passage 26 so as to mechanically support the baffle 10 within the compressor inlet 4. The struts 30 are equispaced about the compressor axis 18 so that each strut 30 is approximately 120° apart from the next strut 30.

During use, working fluid may enter the recirculation passage 22 from the impeller chamber 6 via the first fluid communication passage 26. Accordingly, the first fluid communication passage 26 may be considered to be an inlet of the recirculation passage 22. Since the working fluid entering the recirculation passage 22 has been to some degree compressed by the action of the impeller, the working fluid in the recirculation passage 22 has a higher pressure than the working fluid in the inlet passage 20. As a result, the working fluid leaves the recirculation passage 22 and re-enters the inlet passage 20 via the second fluid communication passage 28. The second fluid communication passage 28 may therefore be considered to be an outlet of the recirculation passage 22.

The above-described structure is an example of a so-called "map width enhancement" structure. By allowing a small amount of compressed fluid to escape from the impeller, for a given pressure ratio, the minimum mass flow required to avoid surge events can be reduced, and hence the "width" of the operating map of the compressor 2 is said to be enhanced.

Figure 3:
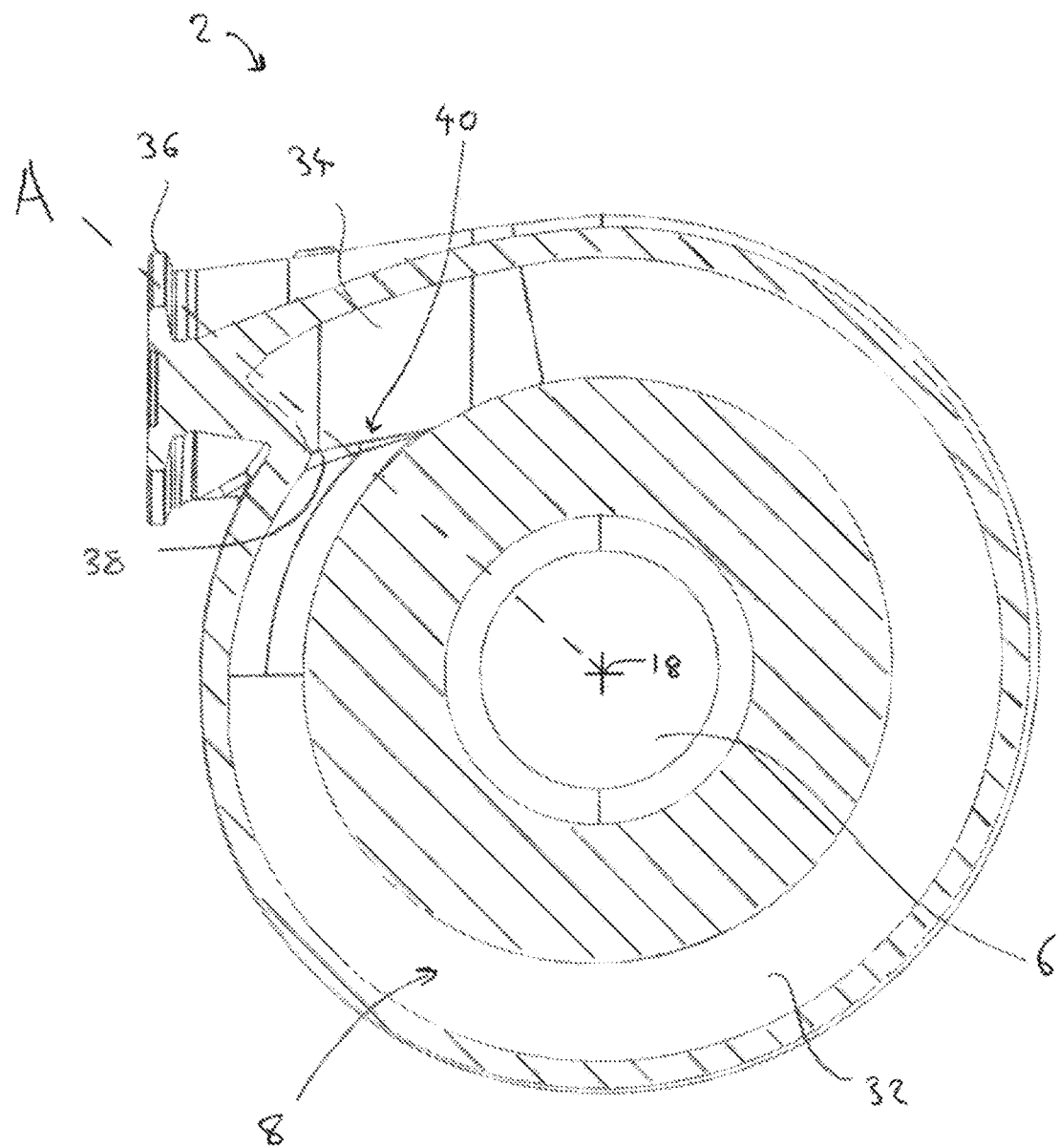
FIG. 3 is a cross-sectional reverse view of a prior art compressor housing taken through line Y-Y of FIG. 1.

With reference to FIG. 3, the outlet 8 comprises a volute portion 32 and an exit portion 34. The volute portion 32 is a generally scroll-shaped part of the outlet 8 that is configured to receive working fluid that has been compressed by the impeller and to guide the working fluid circumferentially around the compressor axis 18 and axially outwards from the compressor axis 18 in a spiral-like motion. The exit portion 34 is a generally pipe-like section of the outlet 8 that receives the working fluid from the volute portion 32. The exit portion 34 comprises a mounting flange 36 configured for connection to a downstream pipe network, for example in an internal combustion engine system. The outlet 8 comprises a tongue 38 defining an interface 40 between an upstream end of the volute portion 32 and the exit portion 34. The interface 40 defines a centre, which is the mid-point between the extremes of the geometry of the tongue 38 in a plane normal to the compressor axis 18. The centre of the interface 40 defines a first angular position A about the compressor axis 18.

Figure 2:
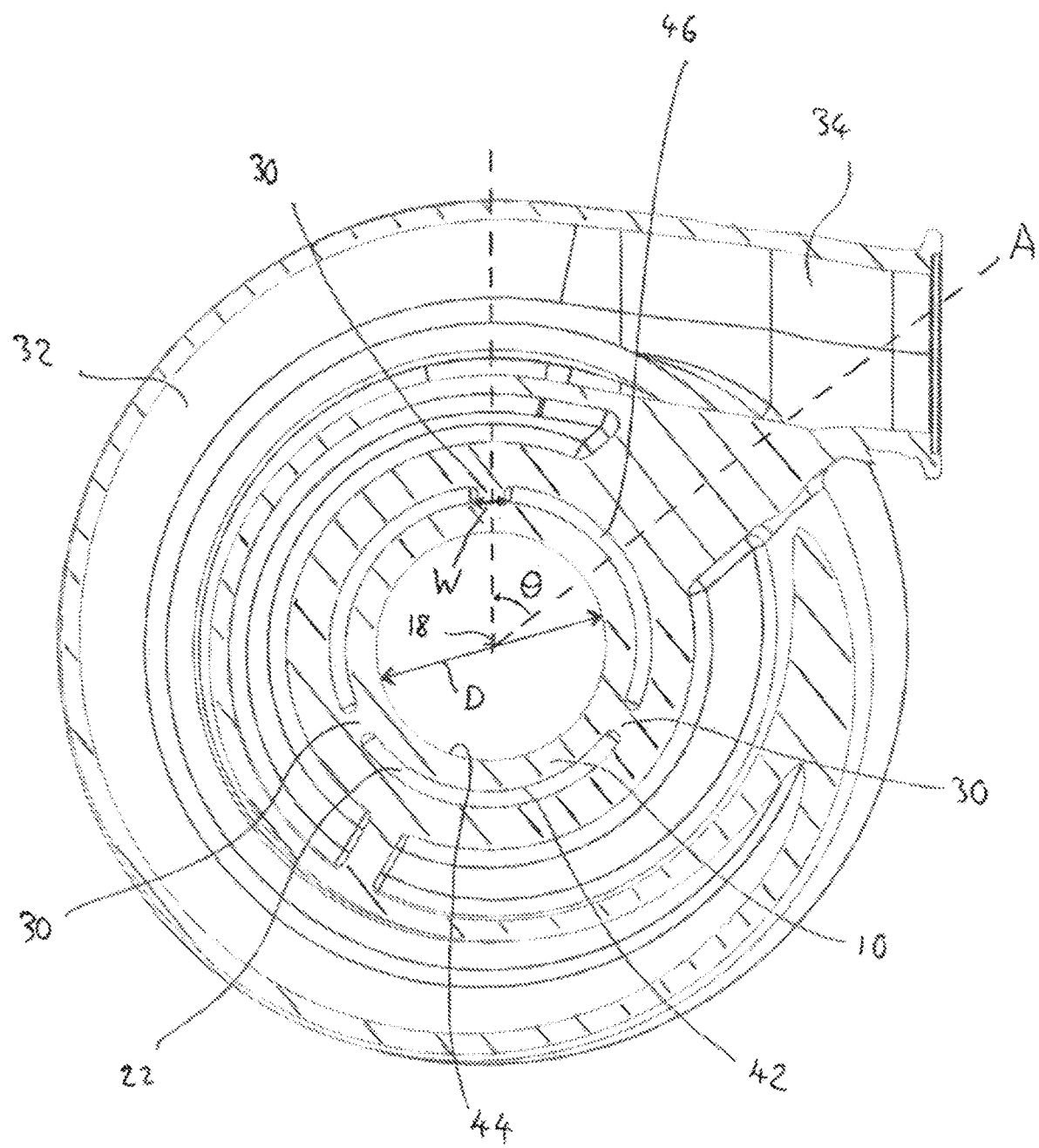
FIG. 2 is a cross-sectional front view of a prior art compressor housing taken through line X-X of FIG. 1.

Turning to FIG. 2, although the tongue 38 and the interface 40 are not shown, the first angular position A is annotated relative to the compressor axis 18 for reference. For the purposes of the present discussion, displacement from the first angular position A is said to be positive in the clockwise direction of the perspective of FIG. 2 (and likewise for FIGS. 6 and 10 discussed below) and negative in the anticlockwise direction. The clockwise direction is positive because, in use, the direction of rotation of the impeller is clockwise. Conversely, given that the direction of rotation of the impeller is positive, the anti-clockwise direction is negative. As can be seen from the figure, the struts 30 are oriented so that one of the struts is positioned at an angle θ of approximately −45° from the first angular position A (which roughly corresponds with the top of the diagram in FIG. 2).

Referring still to FIG. 2, the baffle 10 defines an outer surface 42 on a radially outer side relative to the compressor axis 18 and an inner surface 44 on a radially inner side relative to the compressor axis 18. In the depicted embodiment, the struts 30 are integrally formed with the baffle 10. However, in alternative embodiments the struts 30 may be formed separately to the baffle 10 and attached thereto via the outer surface 42. It will be appreciated that the struts 30 must form a mechanical interface with the outer surface 42 of the baffle 10 to enable the struts 30 mechanically support the baffle 10 within the compressor inlet 4.

Figure 4:
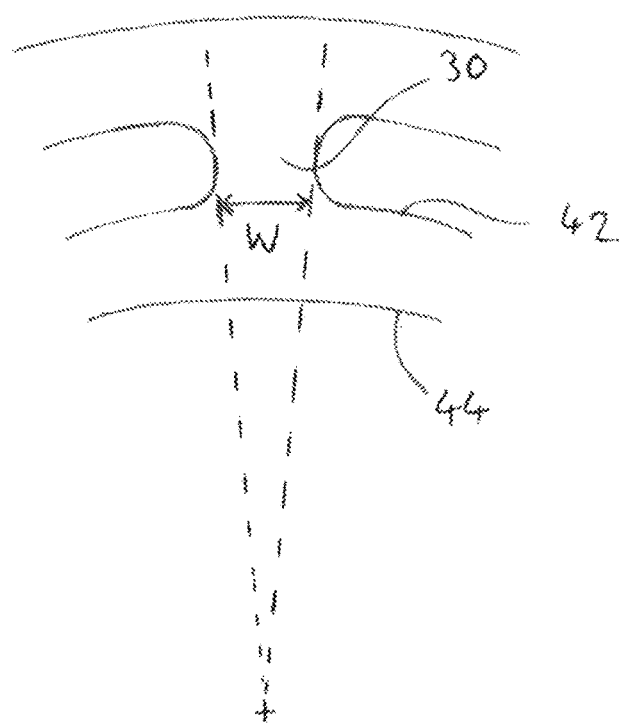
FIG. 4 is a schematic enlarged view of a portion of the prior art cross-section of FIG. 2.

Each strut 30 defines an arcuate width W measured along an interface between the outer surface 42 of the baffle 10 and the strut 30. FIG. 4 shows an enlarged view of a strut 30. With reference to FIG. 4, the arcuate width of the strut 30 is the width of the strut 30 along an arc of a circle having the same radius as the outer surface 42 of the baffle 10. Preferably, the measurement of the arcuate width W of the strut 30 should not take into account the presence of any stress reduction features, such as radiuses or fillets, as this would inflate the true width of the strut from the perspective of the fluid in the recirculation passage 22. Therefore, the arcuate width W may be measured by determining the angular difference between the sides of the strut 30 at its narrowest part relative to the compressor axis and projecting such an angular difference along an arc of a circle having the same radius as the outer surface 42 of the baffle 10. Although, in the present example, the width of the struts is an arcuate distance (i.e. a length), it will be appreciated that the width of the struts may be defined as an angular distance (i.e. an angle).

Referring back to FIG. 2, the inner surface 44 of the baffle 10 defines an inlet passage diameter D. The ratio of the arcuate width W of the struts 30 to the inlet passage diameter D is approximately 0.1:1. It has previously been thought that the arcuate width of the struts 30 should be kept as small as possible so as to reduce the weight of the compressor housing 2 and therefore reduce manufacturing costs.

As mentioned above, the compressor housing 2 of FIGS. 1 to 4 is exemplary of the prior art. During investigation, the inventors have identified that turbulence occurs within the recirculation passage, and in particular within a region of turbulence occurs within a portion 46 of the recirculation passage that is generally aligned with the first angular position A. Without wishing to be limited by theory, it is believed that the presence of turbulence within the recirculation passage 22 increases the time taken for the recirculation passage 22 to equalise pressure between the first fluid communication passage 26 and the second fluid communication passage 24. Accordingly, the inventors have identified a need to improve the flow conditions in the recirculation passage 22.

Figure 5:
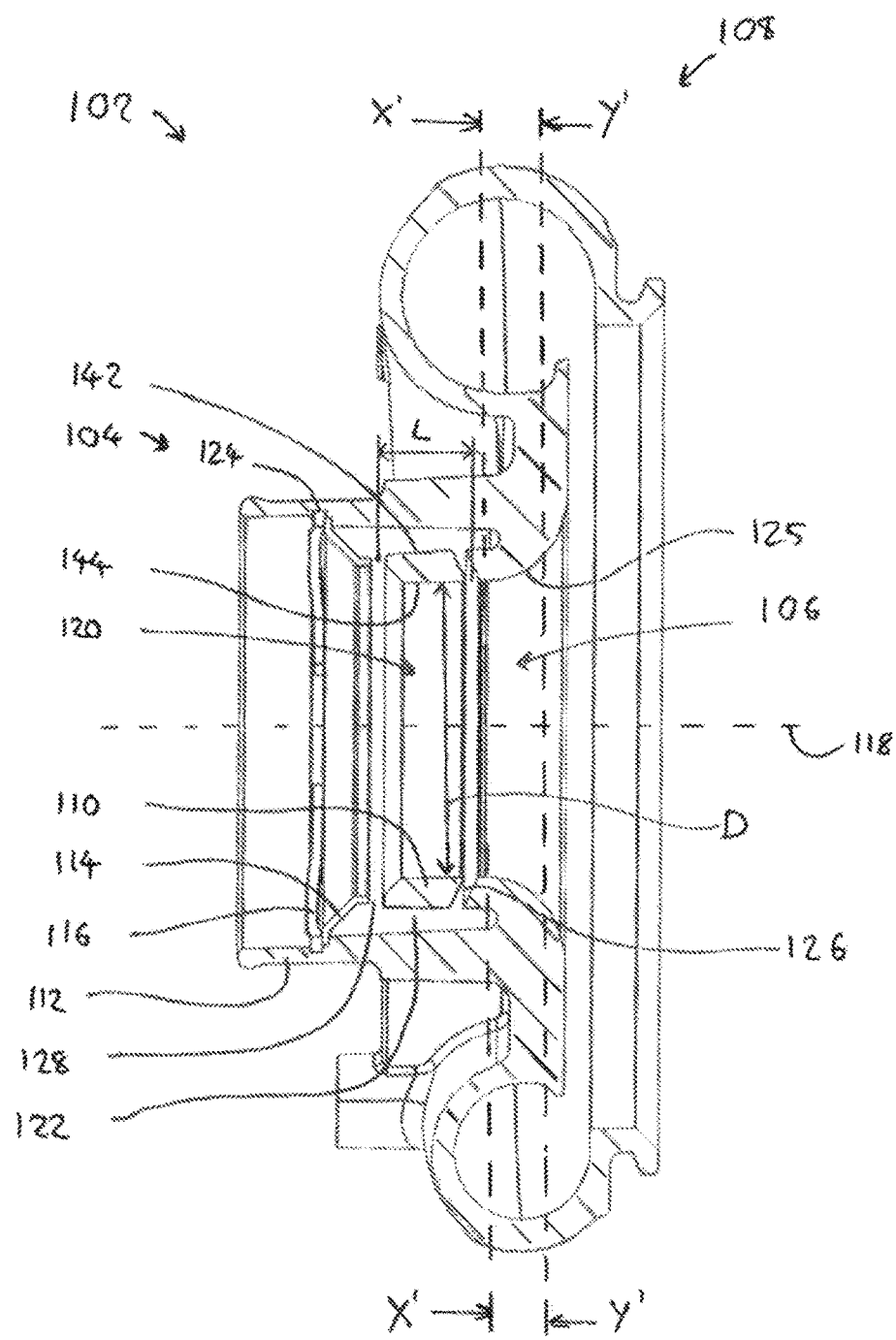
FIG. 5 is a cross-sectional side view of a first embodiment of a compressor housing according to the present invention.
Figure 6:
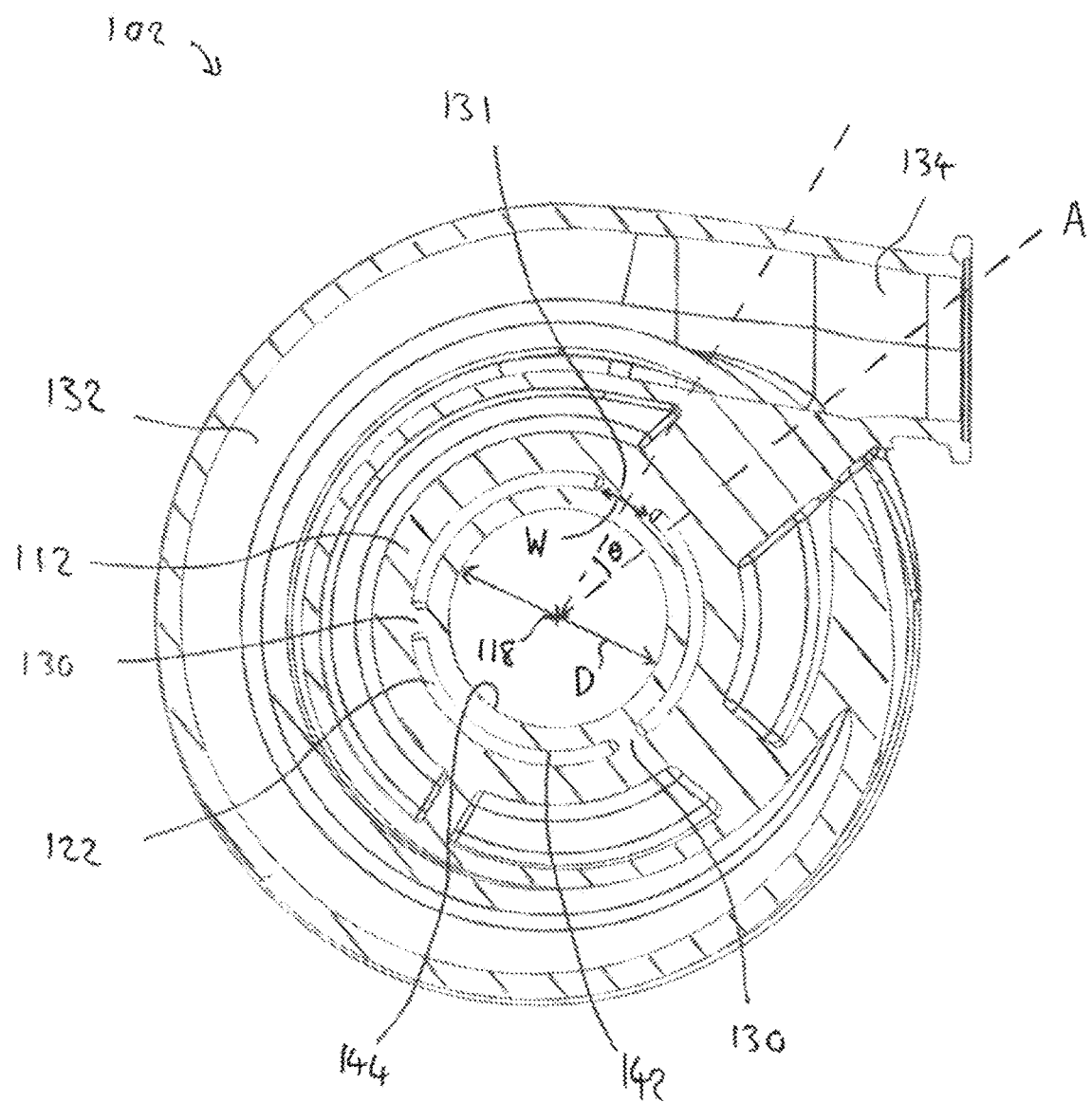
FIG. 6 is a cross-sectional front view the first embodiment of the present invention taken through line X'-X' of FIG. 5.
Figure 7:
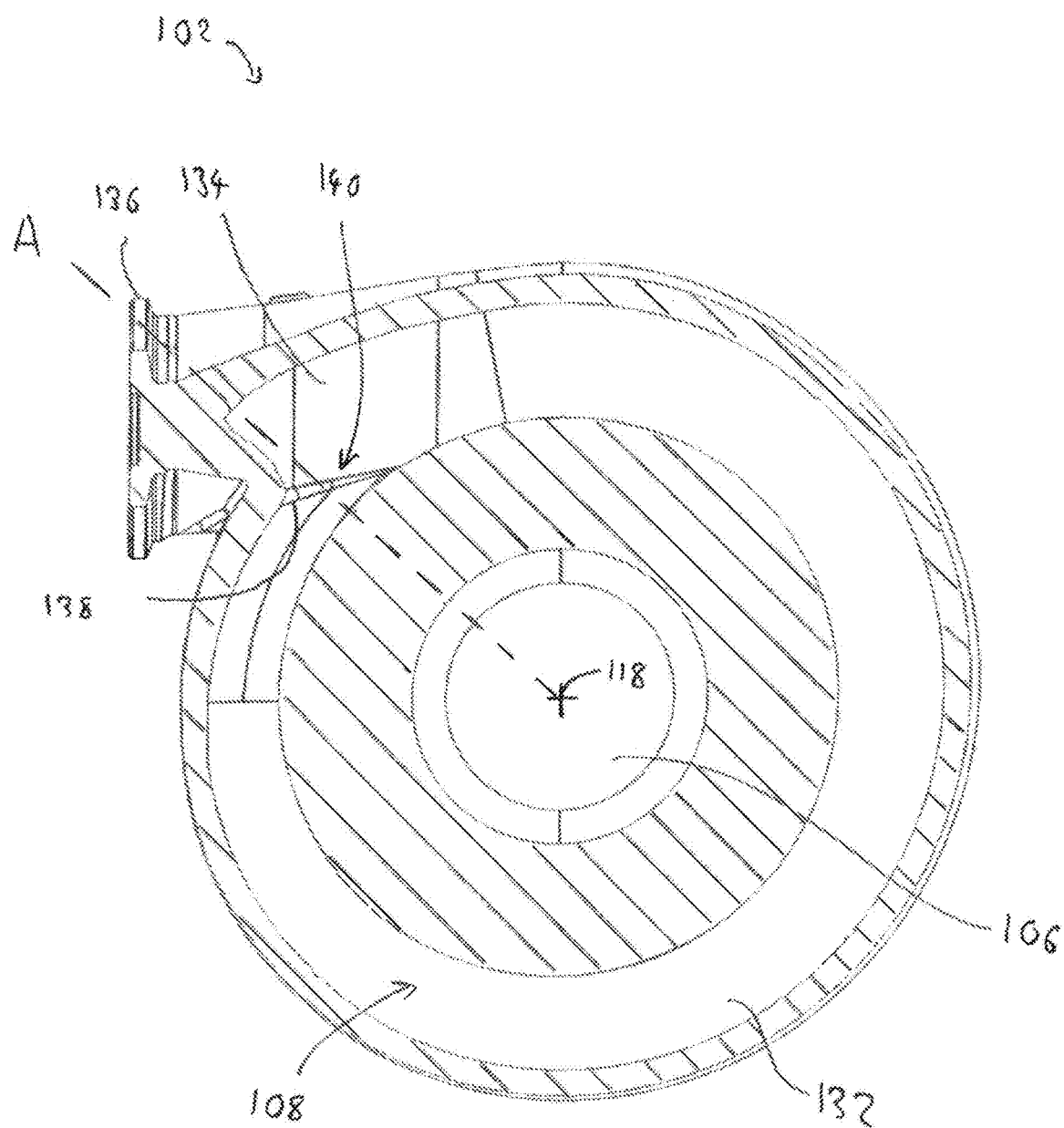
FIG. 7 is a cross-sectional reverse view the first embodiment of the present invention taken through line Y'-Y' of FIG. 5.

FIGS. 5 to 7 show a compressor 102 according to a first embodiment of the present invention. As will be apparent from the figures, the compressor 102 of the first embodiment is substantially similar to the compressor 2 of the prior art. Accordingly, like reference numerals have been used to denote corresponding features of the first embodiment of the invention to those described above in relation to the prior art.

The compressor 102 of the first embodiment of the invention differs from the compressor 2 of the prior art in two principle respects. First, the compressor 102 comprises a wide strut 131 and two narrow struts 130. The narrow struts 130 define the same arcuate width W as the struts 30 of the first embodiment. Accordingly, the ratio of the arcuate width W of the narrow struts 130 to the inlet passage diameter D is approximately 0.1:1. However, the ratio of the arcuate width W of the wide strut 131 to the inlet passage diameter D is approximately 0.23:1. Secondly, the centre of the wide strut 131 of the compressor 102 is positioned at an angle θ of approximately −15° from the first angular position A. The two remaining narrow struts 130 are equispaced relative to the wide strut 131 by an angular spacing of 120° between their centres.

Without wishing to be limited by theory, it is thought that because the wide strut 131 is wider than the struts 30 of the prior art the wide strut 131 displaces a greater volume of fluid within the recirculation passage 122 and is therefore better able to interrupt the formation of turbulence in the recirculation passage 122. As a result, the flow of gas through the recirculation passage 122 is smoothed and the time taken for the recirculation passage 122 to equalise pressure between the first fluid communication passage 126 and the second fluid communication passage 124 is reduced. This increases the capacity of the compressor housing to smooth out pressure pulses that might cause surge events, and results in a reduction in the minimum mass flow required at a given pressure ratio to avoid surge.

Additionally, with regard to the prior art, it is thought that the presence of the tongue 38 causes an increase in static pressure in the vicinity of the bifurcation 40 of the outlet 8, and that this has an influence upstream at the corresponding angular position of the recirculation passage 22 where it results in an increase in turbulence. However, in the first embodiment of the present invention, because the wide strut 131 is aligned closer to the first angular position A, the wide strut 131 sits within the region of turbulence that occurs within the recirculation passage 122 in the vicinity of the first angular position A. It is thought that the combination of the angular position and width of the wide strut 131 interrupts the formation of turbulence in the recirculation passage 122.

Figure 8:
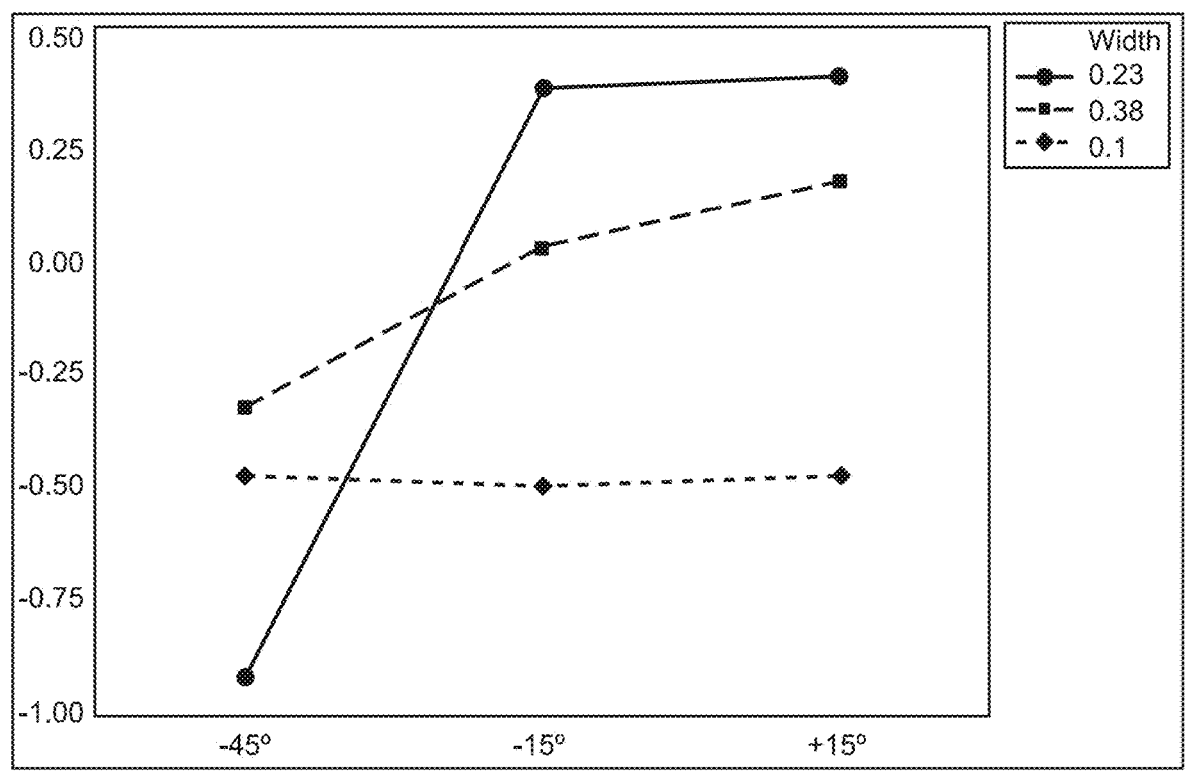
FIG. 8 is a graph of the variation in compressor map width in dependence upon strut width and strut angular position.

FIG. 8 shows a graph of the effect on the so-called "map width" of a compressor based upon the use of different strut widths at different angular positions. As shown in the legend, three ratios of strut width W to inlet passage diameter D were tested, namely 0.1:1, 0.23:1, and 0.38:1. The x-axis shows the angular position of the wide strut 131 relative to the first angular position A. The y-axis shows the difference in compressor map width performance compared to a baseline parameter. In particular, the y-axis shows the difference between, at a given compressor pressure ratio, the surge mass flow parameter with the wide strut 131 at the angular position A and the surge mass flow parameter with the wide strut at the angular position corresponding to the x-axis value. As shown in the figure, the narrowest strut width (0.1:1), corresponding to the width of a prior art strut 30, did not show any improvement in the compressor map width for any angular position investigated. The second strut width investigated (0.23:1) showed a negative impact on compressor map width at −45° relative to the first angular position A. However, when a strut having the second strut width (0.23:1) was placed at −15° or +15° relative to the first angular position A, this produced the biggest increase in compressor map width. The third strut width investigated (0.38:1) produced a moderate improvement in compressor map width at −45° relative to the first angular position A compared to the first strut width. A more significant increase in compressor map width was observed when a strut having the third strut width was placed at −15° and +15° relative to the first angular position, however the increase in compressor map width was less than that provided by the second strut width (0.23:1) at the same angular positions. The above results indicate that the combination of increased strut width W and strut proximity to the first angular position A provide a significant and unexpected improvement over the prior art.

In light of the results above, although the arcuate width W of the wide strut 131 of the first embodiment of the invention defines a ratio relative to the inlet passage diameter D of 0.23:1, it will be appreciated that in alternative embodiments other strut widths are able to provide improved performance over the prior art. Accordingly, the strut 131 may define a ratio of arcuate width W to inlet passage diameter between around 0.15:1 to around 0.4:1, or between around 0.15:1 to around 0.35:1, or between 0.2:1 to around 0.4:1, or between around 0.2:1 to around 0.25:1.

As already discussed, although, in the present example, the width of the struts is an arcuate distance (i.e. a length), it will be appreciated that the width of the struts may be defined as an angular distance (i.e. an angle). In particular, the width of the wide strut (i.e. the angle subtended between the sides of the wide strut at its narrowest part relative to the compressor axis) may be as follows: between approximately 12° and approximately 35° (equivalent to a ratio of arcuate width W to inlet passage diameter between approximately 0.15:1 and approximately 0.4:1), or between approximately 12° and approximately 30° (equivalent to a ratio of arcuate width W to inlet passage diameter between approximately 0.15:1 to approximately 0.35:1), or between approximately 17° and approximately 35° (equivalent to a ratio of arcuate width W to inlet passage diameter between approximately 0.2:1 to approximately 0.4:1), or between approximately 17° and approximately 22° (equivalent to a ratio of arcuate width W to inlet passage diameter between approximately 0.2:1 to approximately 0.25:1).

Likewise, although the strut 131 of the first embodiment is positioned at an angular position θ that is −15° relative to the first angular position, it will be appreciated that in alternative embodiments the strut 131 may be positioned anywhere generally in the range of ±15° relative to the first angular position, and in particular may be aligned with the first angular position. Without wishing to be limited by theory, it is thought that the presence of any part of the strut 131 within the range ±15° relative to the first angular position A is sufficient to hinder the formation of turbulence within this region, and therefore it is not necessary for the centre of the strut 131 to fall within the range ±15° relative to the first angular position A. However, in alternative embodiments, the centre of the strut 131 may fall within this range or be aligned with the first angular position A.

Referring to FIG. 5, the distance between the first fluid communication passage 126 and the second fluid communication passage 126 along the compressor axis 118 defines a recirculation passage length L. Preferably, the distance between the first fluid communication passage 126 and the second fluid communication passage 128 is measured between the axial centre of the first fluid communication passage 126 at the opening formed between the first fluid communication passage 126 and the impeller chamber 106 and the axial centre of the second fluid communication passage 128 at the opening formed between the second communication passage 128 and the recirculation passage 122. This corresponds to the most upstream parts of both passages. The ratio of the recirculation passage length to the inlet passage diameter L:D is around 0.32:1.

Preferably, the ratio of the recirculation passage length to the inlet passage diameter L:D is less than or equal to around 0.6:1, around 0.4:1, or around 0.3:1. By reducing the ratio of the recirculation passage length to the inlet passage diameter L:D the size of the inlet 204 can be reduced, leading to materials costs savings and a more compact construction. It was previously thought that surge margin performance could only be improved by increasing the ratio of the recirculation passage length to the inlet passage diameter L:D, as discussed in EP 1,473,465 referenced above. However, the inventors of the present invention have found that by appropriately controlling the arcuate width and angular position of the strut 131, improved surge margin performance can be achieved with smaller ratios of recirculation passage length to the inlet passage diameter L:D. Nevertheless, in alternative embodiments the ratio of the recirculation passage length to the inlet passage diameter L:D may have substantially any suitable value.

With reference to FIG. 6, it can be seen that only a single strut 131 is present within the region extending ±15° relative to the first angular position A. It has been found that the presence of a single strut in the vicinity of the first angular position is sufficient to prevent or impede the formation of turbulence within the recirculation passage 122 and therefore provide the benefits described above. This is particularly advantageous since prior art compressor housings typically comprise three struts, and therefore the performance of the compressor housing 102 can be increased without significantly altering the compressor housing geometry. This enables the possibility of retrofitting the compressor housing 102 to existing prior art compressors.

Figure 9:
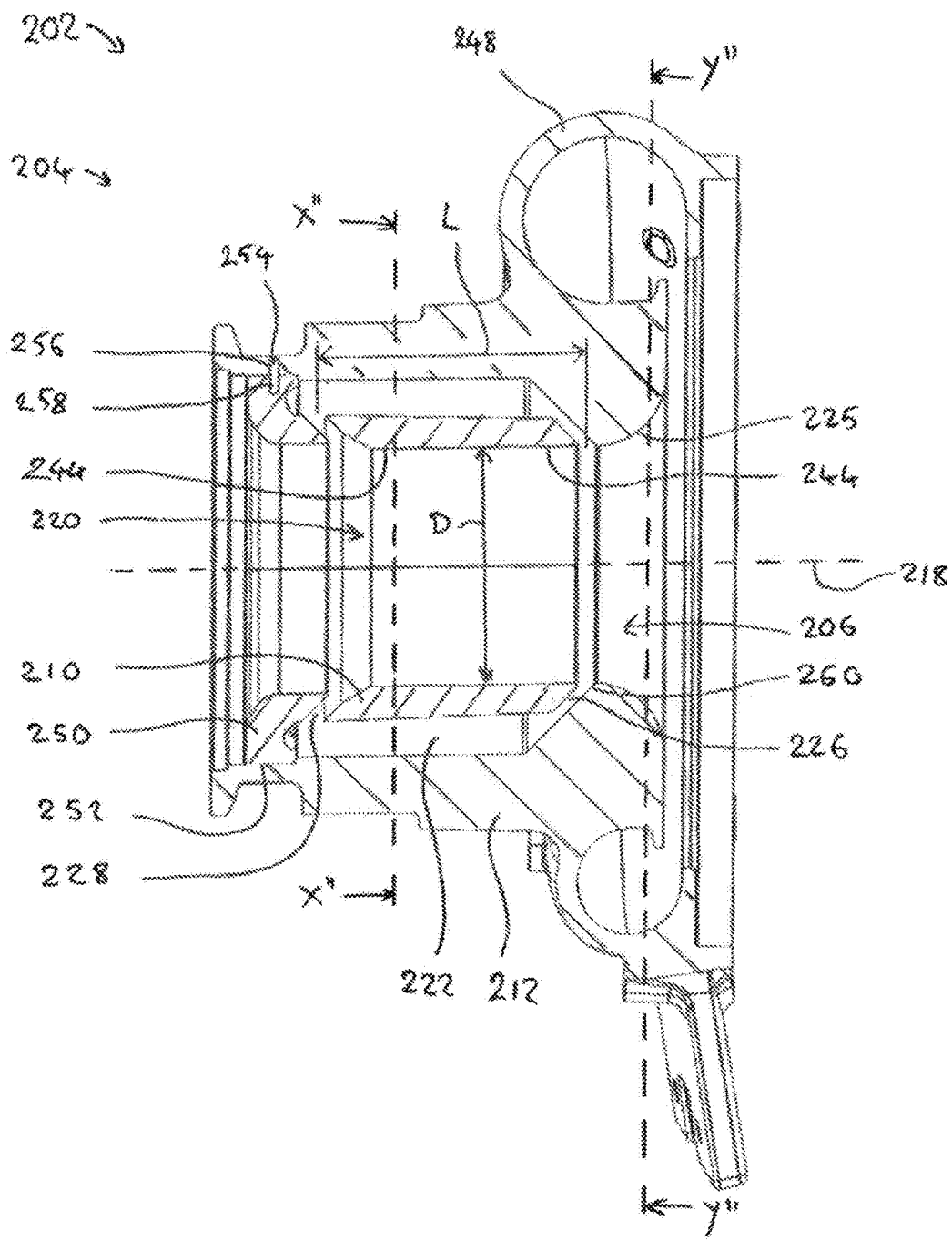
FIG. 9 is a cross-sectional side view of a second embodiment of a compressor housing according to the present invention.
Figure 10:
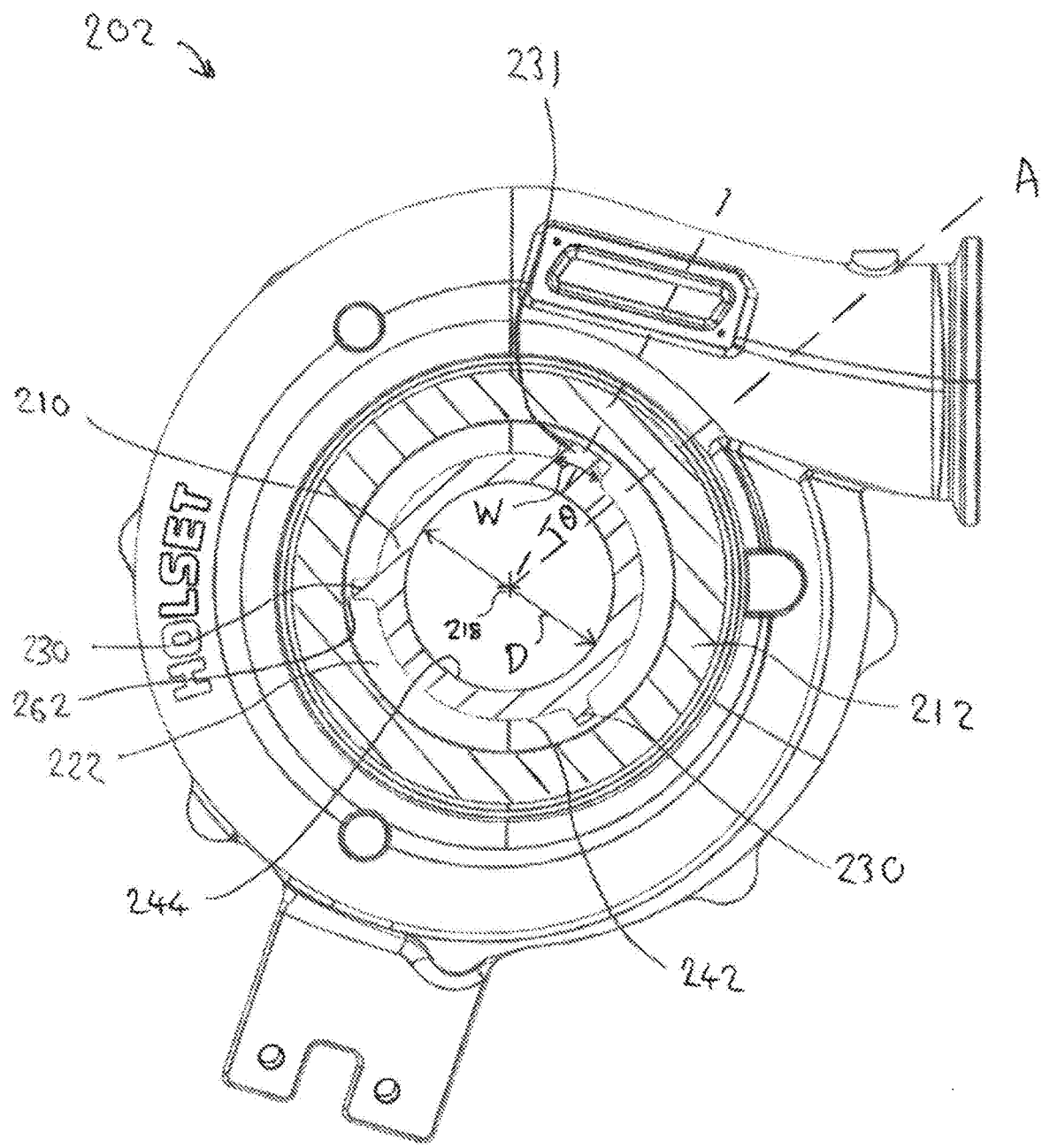
FIG. 10 is a cross-sectional front view the second embodiment of the present invention taken through line X"-X" of FIG. 9.
Figure 11:
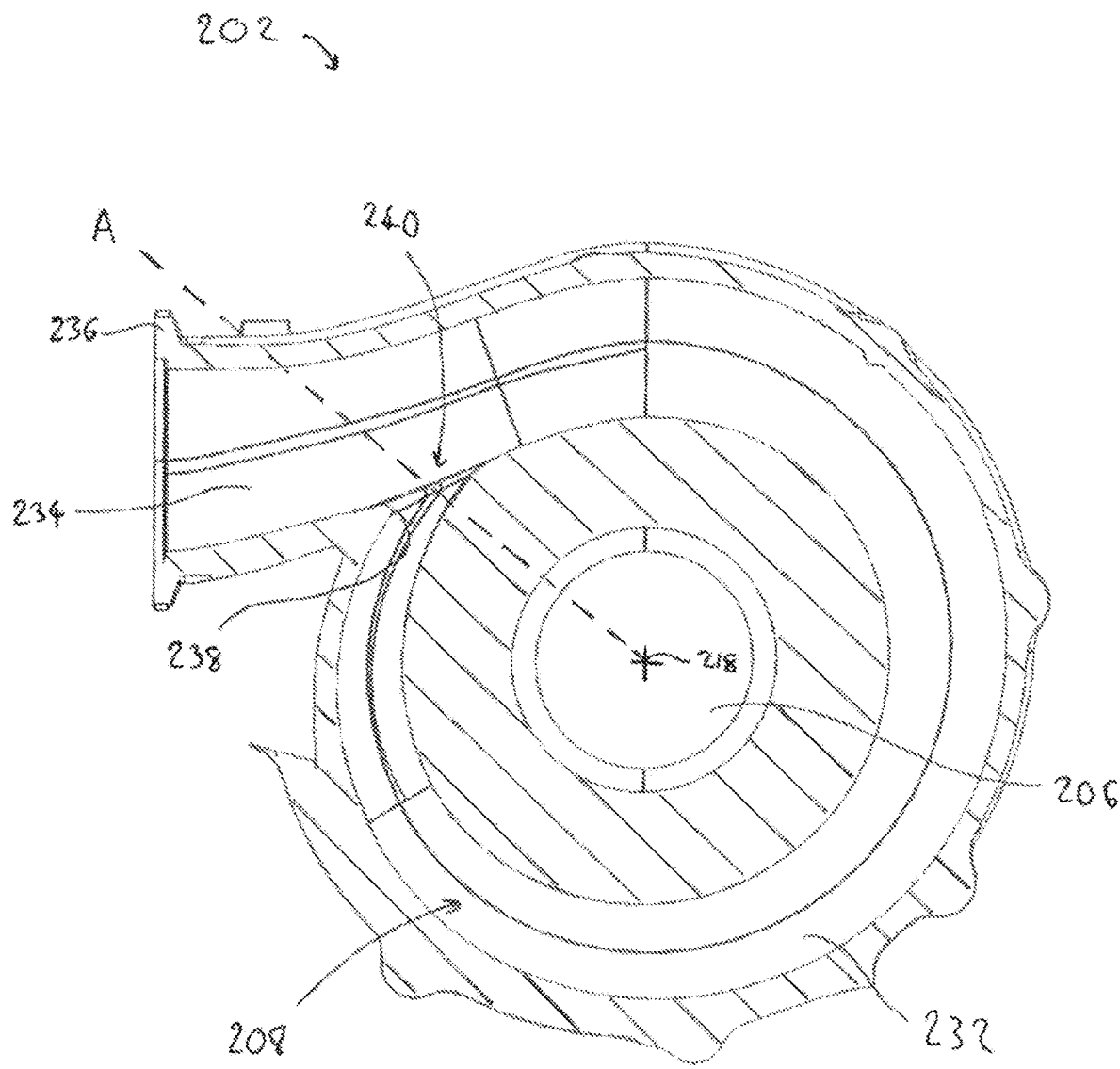
FIG. 11 is a cross-sectional reverse view the second embodiment of the present invention taken through line Y"-Y" of FIG. 9.

FIGS. 9 to 11 show a further embodiment of a compressor housing 202 according to the present invention. The compressor housing 202 of the second embodiment of the invention is similar to the compressor housing 102 of the first embodiment of the invention and therefore like reference numerals have been used to denote like features.

The compressor housing 202 of the second embodiment of the invention differs from the compressor housing 102 of the first embodiment of the invention principally in that the baffle 210 is a baffle insert that is formed separately to a compressor body 248. The baffle insert 210 comprises a radially and circumferentially extending collar 250 that is received within a corresponding recess 252 formed in the outer wall 212 of the compressor body 248 so as to support the baffle insert 210 within the inlet 204. The collar 250 is rotationally fixed relative to the outer wall 212 via a pin 254 received through a pin hole 256 of the outer wall 212 and into a blind bore 258 of the collar 250. The pin 254 and the pin hole 256 may be considered to define a first rotational location formation and the blind bore 258 may be considered to define a second rotational location formation. Together, the first and second rotational location formations form a rotational location coupling. In alternative embodiments, the rotational location coupling may comprise any suitable means of preventing rotation between the collar 250 and the outer wall 212, such as for example via the use of keyways and mating splines, adhesive, welding, interference fits, fasteners or the like. Although not shown, the compressor housing 202 comprises three sets of pins 254, pin holes 256 and blind bores 258 evenly spaced around the compressor axis 218. In alternative embodiments, substantially any number rotational location couplings may be used, and such rotational couplings may be evenly or unevenly spaced around the compressor axis 218.

As in the previous embodiment, the compressor housing 202 of the second embodiment of the invention comprises a first flow recirculation passage 226 and a second flow recirculation passage 228. However, in contrast to the previous embodiment, in the second embodiment the first flow recirculation passage is formed between a terminal end of the baffle insert 210 distal to the collar 250 and a surface 260 of the housing body 248. Additionally, the second flow communication passage 228 is defined by a circumferentially extending groove of the baffle insert 210 close to the collar 250. As per the previous embodiment, the baffle insert 210 comprises three struts, namely two narrow struts 230 and one wide strut 231. However, in contrast to the first embodiment, the struts 230, 231 extend across the second fluid communication passage 228 to support an annular portion of the baffle insert 210.

With reference to FIG. 10, the struts 230, 231 extend from the outer surface 242 of the baffle insert 210 in a radially outwards direction relative to the compressor axis 218 towards the inner wall 210. However, the struts 230, 231 do not extend as far as the inner wall 210, and stop just short of the inner wall 210 so as to leave a gap 262 (alternatively, this may be referred to as a clearance). The gap 262 is provided to assist the receipt of the baffle insert 210 within the space bounded by the inner wall 212 during assembly. However, in alternative embodiments the struts 230, 231 may extend up to and contact the inner wall 212. Preferably, the struts 230, 231 extend at least 50% of the radial distance between the outer surface 242 of the baffle insert 210 and the inner wall 212. It has been found that when the struts 230, 231 extend more than 50% of the radial distance from the outer surface 242 to the inner wall 212, the radial extent of the struts 230, 231 is sufficiently large enough to prevent or impede the formation of turbulence in the recirculation passage 222 in the vicinity of the first angular position A.

In contrast to the first embodiment, the ratio of the recirculation passage length to the inlet passage diameter L:D, of the second embodiment is around 1.15. However, it will be appreciated that in alternative embodiments the ratio of the recirculation passage length to the inlet passage diameter L:D may be any suitable value, and in particular may be any of the values discussed above in relation to the first embodiment of the invention.

Aside from the differences explained above, the wide strut 231 otherwise may have substantially the same form and be positions at corresponding angular locations relative to the first angular position as explained in relation to the first embodiment.

Figure 12:
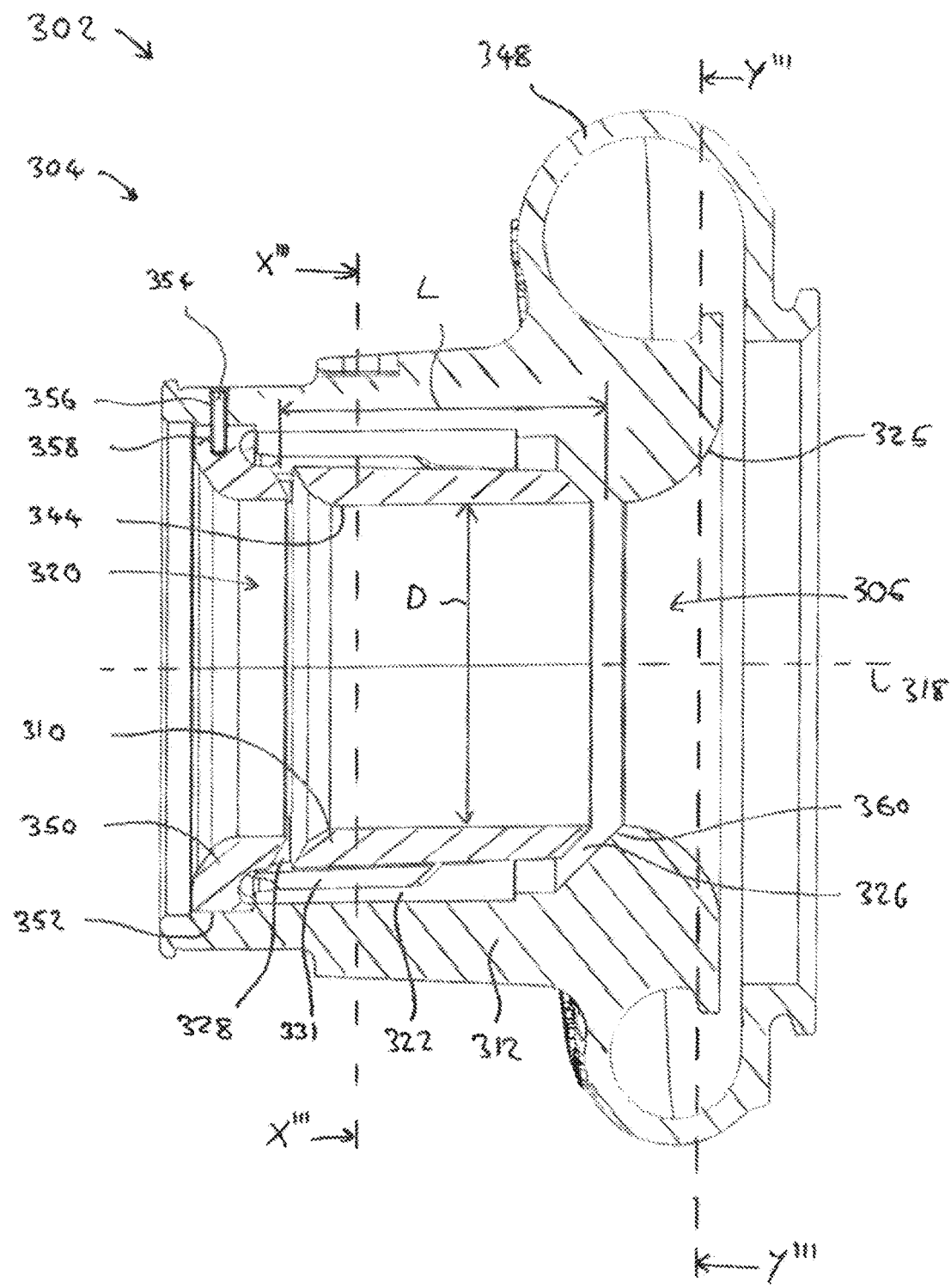
FIG. 12 is a cross-sectional side view of a second embodiment of a compressor housing according to the present invention.
Figure 13:
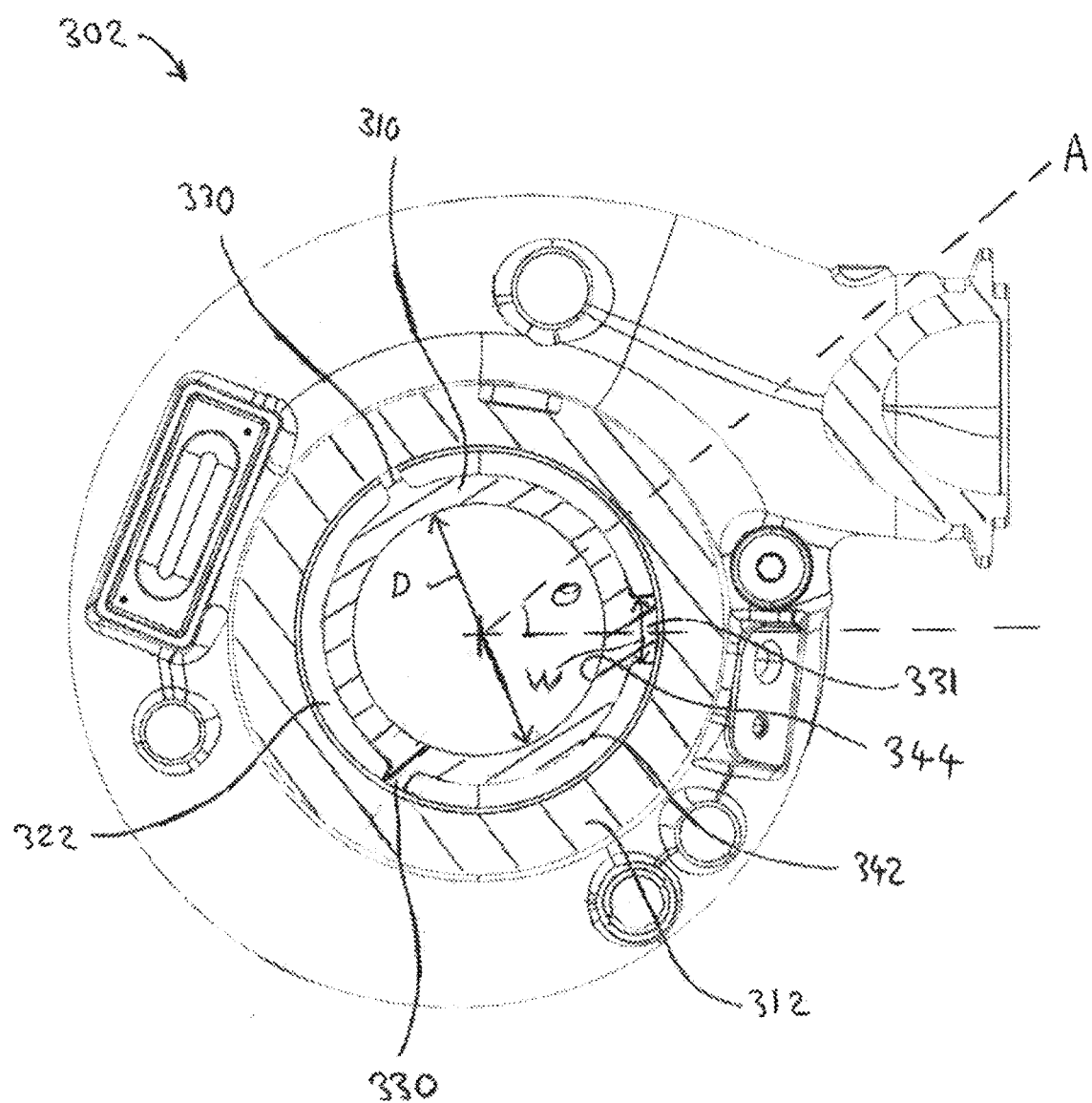
FIG. 13 is a cross-sectional front view the second embodiment of the present invention taken through line X'''-X''' of FIG. 12.
Figure 14:
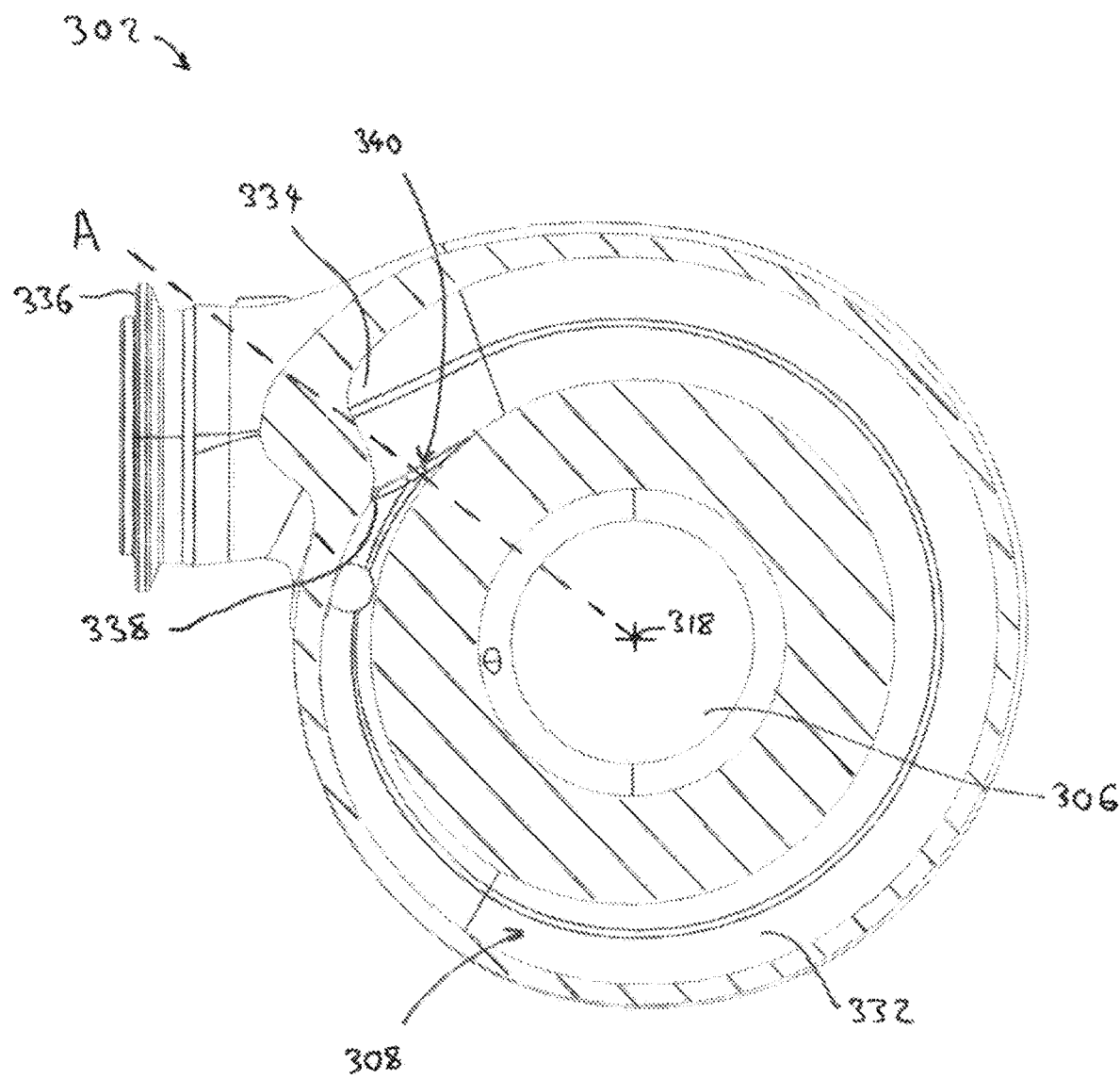
FIG. 14 is a cross-sectional reverse view the second embodiment of the present invention taken through line Y'''-Y''' of FIG. 12.

FIGS. 12 to 14 show a third embodiment of a compressor housing 302 according to the present invention. The compressor housing 302 of the third embodiment is substantially the same as the compressor housing of the second embodiment, and differs as described below. In particular, in the third embodiment, the wide strut 313 is positioned approximately at θ=+45° relative to the first angular position A. Even though the wide strut 331 is not within the region extending ±15° relative to the first angular position, it has been found that the increased width of the strut 331 is sufficient to provide improved compressor map width compared to the struts 30 of the prior art (FIGS. 1 to 4).

The third embodiment of the invention further differs from the second embodiment of the invention in that the struts 330, 331 extend across the entire radial extent of the recirculation passage 322 such that they contact the outer wall 312. It is thought that because at least the wide strut 331 contacts the outer wall 312 the wide strut 331 is able to interrupt circumferential flow around the compressor axis 318 in the recirculation passage 322. Accordingly, this helps to disturb the formation of turbulence in the recirculation passage 322 therefore enhances the compressor map width.

Figure 15:
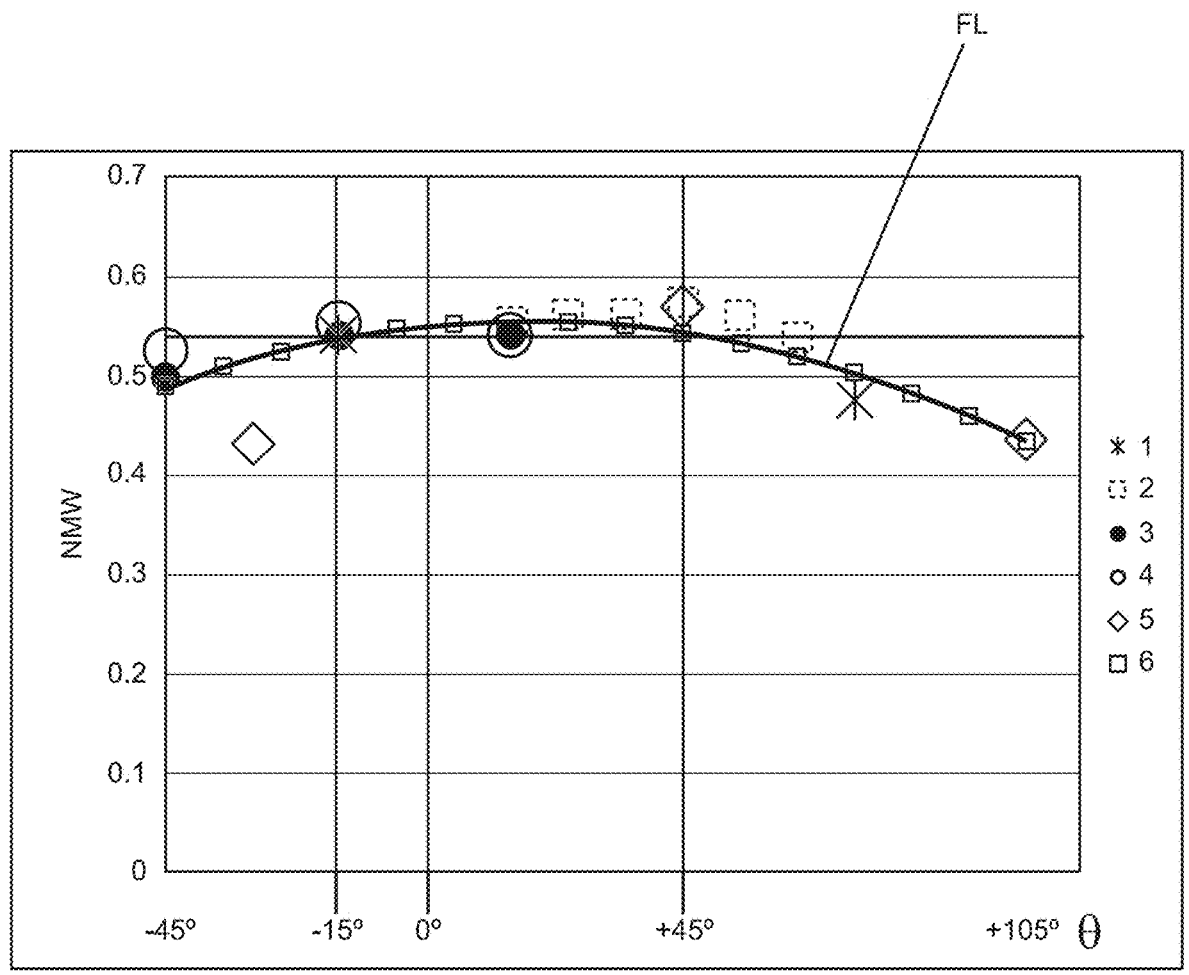
FIG. 15 is a graph of the variation in normalised map width as a function of angular position of the wide strut for several different compressor geometries.
Figure 16:
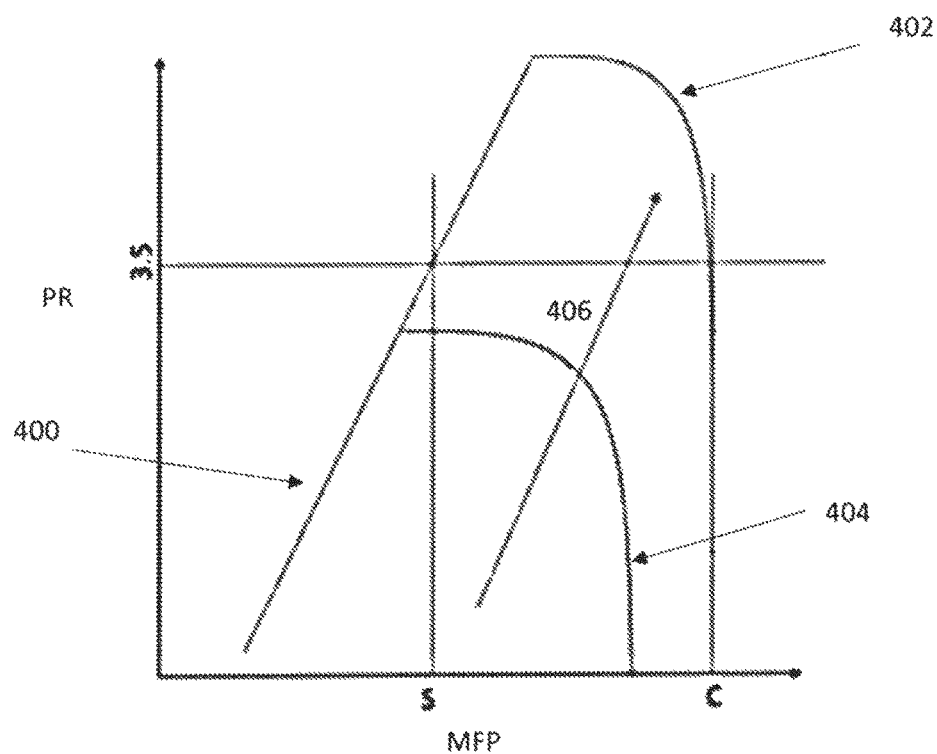
FIG. 16 shows a schematic compressor map to aid understanding of how the data within the graph of FIG. 15 was obtained.

FIG. 15 shows a graph of the variation in normalised map width as a function of angular position of the wide strut for several different compressor geometries. FIG. 16 shows a schematic compressor map to aid understanding of how the data within the graph of FIG. 15 was obtained.

Referring first to FIG. 16, the compressor map, as is conventional, plots, on the y axis, pressure ratio PR for a particular compressor, against, on the x axis, the mass flow parameter MFP for said compressor. The plot shows the surge line 400, a line 402 showing the relationship between PR and MFP when the rotor is operating at its maximum speed, and a line 404 showing the relationship between PR and MFP when the rotor is operating at approximately 50% of the maximum rotor speed. Arrow 406 indicates the direction on the graph of increasing rotor speed.

A surge mass flow parameter at a pressure ratio PR of 3.5 is indicated by S. A choke mass flow parameter (which is the maximum mass flow parameter at 60% efficiency on the maximum rotor speed line 402) at a pressure ratio PR of 3.5 is indicated by C. The pressure ratio of 3.5 has been chosen as this is representative of a compressor pressure ratio at a maximum engine load condition at sea level (atmospheric pressure of air approximately equal to 101.3 kPa).

Returning now to FIG. 15, as already mentioned, this shows a graph of the variation in normalised map width NMW as a function of angular position θ of the wide strut for several different compressor geometries. The angular position θ is measured relative to first angular position A. The graph includes data points for six different compressor geometries—these are labelled 1 to 6.

The normalised map width NMW for each data point is calculated as follows. With reference to FIG. 16, the compressor map is obtained for each particular compressor geometry with the wide strut at the relevant angular position. The normalised map width for the particular compressor geometry with the wide strut at the relevant angular position is calculated by subtracting S (the surge mass flow parameter at a pressure ratio PR of 3.5) from C (the choke mass flow parameter at a pressure ratio PR of 3.5) and then dividing this quantity by C.

The normalised map width NMW provides an indication of the performance of the compressor which is independent of the geometry of the compressor. The greater the normalised map width NMW, the better the performance of the compressor. A fit line FL has been applied to the data. It can be seen that, according to the fit line, the maximum normalised map width NMW (and hence best compressor performance) occurs when the wide strut is located at angular position θ which is about 15°. The fit line also indicates that a normalised map width NMW which is greater than or equal to about 97.5% of the maximum normalised map width is obtained when the wide strut is located in the angular range of θ being between about −15° and about +45°. This is the angular range of the position of the wide strut which provides the best compressor performance.

With respect to any of the embodiments above, it will be appreciated that in alternative embodiments a compressor housing according to the present invention may comprise substantially any number of first and second fluid communication passages. For example, instead of a single passage, a series of radially extending holes or the like may alternatively be used. Additionally, it will be appreciated that whilst the above embodiments of the invention comprise three struts, in alternative embodiments of the invention, substantially any number of struts may be used, provided that at least one strut is a so-called "wide" strut having an arcuate strut width W as described above.

The invention claimed is:

1. A compressor housing for a compressor, the compressor housing comprising:
   an inlet comprising:
      an inlet passage configured to receive intake gas, the inlet passage being defined at least in part by a baffle; and
      a recirculation passage defined between the baffle and an outer wall;
   an impeller chamber in fluid communication with the inlet passage and configured to contain an impeller supported for rotation about a compressor axis;
   a first fluid communication passage extending between the impeller chamber and the recirculation passage to permit fluid communication therebetween;
   a second fluid communication passage extending between the inlet passage and the recirculation passage to permit fluid communication therebetween;
   an outlet in fluid communication with the impeller chamber, the outlet comprising a volute portion and an exit portion, the volute portion and the exit portion defining a bifurcation therebetween; and
   a plurality of struts including a strut being wider than the other struts in the plurality of struts, the wider strut extending across one of the first fluid communication passage or the second fluid communication passage so as to support the baffle, the strut extending circumferentially around at least a portion of the baffle;
   wherein a centre of the bifurcation defines a first angular position (A) relative to the compressor axis, and the strut is configured to block at least a portion of the recirculation passage that is in the angular range of about −15° to about +45° relative to the first angular position (A); and wherein the baffle defines an outer surface on a radially outer side relative to the compressor axis and an inner surface on a radially inner side relative to the compressor axis; and
   wherein the strut defines an arcuate width (W) measured along an interface between the outer surface of the baffle and the strut, the inner surface defines an inlet passage diameter (D), and the ratio of the arcuate width of the strut to the inlet passage diameter (W:D) is between around 0.15:1 to around 0.35:1.

2. The compressor housing according to claim 1, wherein the ratio of the strut width to the inlet passage diameter is between around 0.2:1 to around 0.4:1, or around 0.2:1 to around 0.25:1, or around 0.23:1.

3. The compressor housing according to claim 1, wherein the angular centre of the wider strut relative to the compressor axis is positioned within the range of about −15° to about +45° relative to the first angular position.

4. The compressor housing according to claim 1, wherein the portion of the recirculation passage that is within the range of about −15° to about +45° relative to the first angular position contains a single strut.

5. The compressor housing according to claim 1, wherein the wider strut is configured to block at least a portion of the recirculation passage that is around 45° from the first angular position (A).

6. The compressor housing according to claim 1, wherein the wider strut and the baffle are integrally formed.

7. The compressor housing according to claim 1, wherein:
   the distance between the first fluid communication passage and the second fluid communication passage along the compressor axis defines a recirculation passage length L; and
   the ratio of the recirculation passage length to the inlet passage diameter (L:D) is less than or equal to around 0.6:1, around 0.4:1, or around 0.2:1.

8. The compressor housing according to claim 1, wherein:
   the recirculation passage defines a recirculation passage width in a radial direction relative to the compressor axis; and
   the wider strut extends across at least 50% of the recirculation passage width.

9. The compressor housing according to claim 1, wherein the compressor housing comprises a compressor body defining the outer wall and a baffle insert defining the baffle, the baffle insert and the compressor body being separately formed.

10. The compressor housing according to claim 9, wherein the first fluid communication passage is defined between an end of the baffle insert and the compressor body.

11. The compressor housing according to claim 9, wherein the second fluid communication passage is defined by the baffle insert.

12. The compressor housing according to claim 9, wherein the wider strut extends across the second fluid communication passage.

13. The compressor housing according to claim 9, wherein the insert comprises a radially extending collar defining an end of the recirculation passage, the collar being configured to engage the outer wall so as to hold the baffle insert within the compressor body.

14. The compressor housing according to claim 9, wherein the baffle insert comprises a first rotational location formation and the compressor body comprises a second rotational location formation, the first and second rotational location formations being configured to engage one another so as to determine the angular position of the wider strut.

15. The compressor housing according to claim 1, wherein the compressor comprises a compressor body defining the outer wall and the baffle such that the outer wall and the baffle are integrally formed, and wherein the compressor housing further comprises an end cap received within the outer wall, the end cap being separately formed to the compressor body.

16. The compressor housing according to claim 15, wherein the first fluid communication passage is defined by the compressor body.

17. The compressor housing according to claim 15, wherein the wider strut extends across the first fluid communication passage.

18. The compressor housing according to claim 15, wherein the second fluid communication passage is defined between an end of the baffle and the end cap.

19. The compressor housing according to claim 15, wherein the end cap comprises a radially extending collar defining an end of the recirculation passage, the collar being configured to engage the outer wall so as to hold the end cap within the compressor housing.

20. A baffle insert for a compressor housing, the baffle insert comprising a generally tubular body extending along a central axis and defining:
    an outer surface on a radially outer side relative to the central axis and configured to at least partially define a recirculation passage of an inlet of the compressor during use;
    an inner surface on a radially inner side relative to the central axis, the inner surface defining an inlet passage diameter (D);
    a fluid communication passage extending between the inner surface and the outer surface; and
    a plurality of struts, including a strut being wider than the other struts in the plurality of struts, the wider strut extending radially outwards from the outer surface and across the fluid communication passage, the strut extending circumferentially around at least a portion of a baffle, wherein the strut defines an arcuate width (W) measured along an interface between the outer surface of the baffle and the strut;
    wherein the ratio of the arcuate width of the strut to the inlet passage diameter (W:D) is between around 0.15:1 to around 0.35:1.

21. The baffle insert according to claim 20, wherein the ratio of the strut width to the inlet passage diameter is between around 0.2:1 to around 0.3:1, or around 0.2:1 to around 0.25:1, or around 0.23:1.

22. The baffle insert according to claim 20, wherein the wider strut and the baffle are integrally formed.

23. The baffle insert according to claim 20, wherein the baffle insert defines a distal end relative to the fluid communication passage, the distance between the fluid communication passage and the distal end along the central axis defines a recirculation passage length; and the ratio of the recirculation passage length to the inlet passage diameter is less than or equal to around 0.6:1.

24. The baffle insert according to claim 23, wherein the ratio of the recirculation passage length to the inlet passage diameter is less than or equal to around 0.4:1, or around 0.2:1.

25. The baffle insert according to claim 20, wherein the baffle insert comprises a radially extending collar at least partially defining an end of the recirculation passage during use, the collar being configured to engage an outer wall of a compressor body of the compressor housing to hold the insert within the compressor body, the outer wall at least partially defining the recirculation passage during use.

26. The baffle insert according to claim 25, wherein the baffle insert comprises a rotational location formation configured to engage a corresponding location formation of a compressor housing so as to position the baffle at a predetermined angular position relative to the compressor body.

27. A compressor comprising the compressor housing according to claim 1.

\* \* \* \* \*